INVENTORS
NORMAN SHORR
HUBERTUS W.V. WILLEMS

ATTORNEYS

United States Patent Office 3,515,531
Patented June 2, 1970

3,515,531
HIGH TEMPERATURE TRACTION ROLLS
Norman Shorr, Pittsburgh, and Hubertus W. V. Willems, Natrona Heights, Pa., assignors to PPG Industries, Inc., a corporation of Pennsylvania
Filed May 1, 1967, Ser. No. 635,155
Int. Cl. C03b *13/16*
U.S. Cl. 65—253         4 Claims

ABSTRACT OF THE DISCLOSURE

Traction rolls capable of use in material handling processes and apparatus especially for operation at elevated temperatures. The material engaging surface contains a mixture of anthophyllite asbestos fibers and an aluminum silicate fibrous material with a suitable binder.

BACKGROUND OF THE INVENTION

In the handling of materials at high temperatures, as on the order of temperatures above about 1200° F. and especially in the handling of glass at such temperatures, traction rolls constructed of a plurality of discs of asbestos have been used. In the Pennvernon process for making sheet glass, the traction rolls are constructed of a plurality of the discs assembled onto a steel mandrel and compressed thereon. The discs are clamped by collars under high pressure, as for example, 1200 to 1500 pounds per square inch. The fixed collars maintain the discs under pressure. After clamping, the rolls are lathe-turned for trueness and surface finish. Generally in the past, such discs have been cut from boards made from a wet slurry of the common chrysotile asbestos fiber and a binder, generally portland cement in the range of 5 to 10 percent of the weight of the mixture. A chemical composition of chrysotile asbestos is $3MgO.2SiO_2.2H_2O$.

At elevated temperatures of operation in a glass drawing apparatus a roll constructed of chrysotile asbestos acquires a glazed surface and deteriorates rapidly. Chrysotile asbestos has a high ignition or weight loss, on the order of 16 percent by weight, and breaks down when exposed for a length of time to temperatures on the order of 900°–1100° F. encountered especially in the lower sets of rolls in a glass drawing machine. The ignition loss is a limiting factor with respect to the temperatures at which the material can be used without breakdown and composition change. The chrysotile asbestos when so exposed changes composition and the discs from which the rolls are made separate permitting chips to be retained so as to damage the surface of the glass contacted by the roll.

In the copending application of Norman Shorr, Ser. No. 432,518 filed Feb. 15, 1965, now U.S. Pat. No. 3,317,303 and owned by the same assignee; there is disclosed and claimed improved traction rolls for use at elevated temperatures, which rolls contain at least 30 percent by weight of an asbestos fiber selected from the group consisting of anthophyllite asbestos, amosite asbestos, tremolite asbestos, actinolite asbestos and mixtures thereof. The disclosure of this application is incorporated herein by reference.

The traction rolls described and claimed in the aforesaid application have proved very successful in the sheet glass industry, and such rolls are usable at higher temperatures without the deficiencies of the all chrysotile rolls. They may be operated safely at 1200° F. or above, as for example, up to perhaps 1600° F. Generally such rolls incorporate the common chrysotile asbestos in some amounts for flexibility and board-making capability.

The chrysotile asbestos content, as will be readily understood, is a factor which determines the temperature range in which the roll of the Shorr application can be used. Thus by decreasing the chrysotile asbestos content, the usable temperature range can be extended.

SUMMARY OF THE INVENTION

The present invention is an improvement over the aforesaid Shorr invention in that by using a mixture containing as the essential ingredients, anthophyllite asbestos, an aluminum silicate fiber produced under the names Fiberfrax by the Carborundum Company or Kaowool by Babcock & Wilcox Company and a suitable binder, such as portland cement, a disc for rolls can be produced which is suitable for use at temperatures approximately 500° F. higher than those described in the aforesaid Shorr application.

The binder content rarely exceeds 10 percent based on the weight of the mixture. Generally it is preferred to use a mixture containing about 75 percent by weight of anthophyllite asbestos. No chrysotile asbestos is used; thus the temperature limitations of such asbestos are not present in the mixture. The Fiberfrax can be a long, flexible fiber and is suitable in the board-making process. Fiberfrax itself, however, does not produce a suitable disc because with a binder, necessary for a board product, the roll becomes too hard or disintegrates.

DESCRIPTION OF THE DRAWING

In FIG. 1, a ribbon of glass 10 is drawn upwardly from a molten bath 12 through a cooled drawing chamber 14 by means of a drawing machine 16 having pairs of traction rolls 18 which engage the surfaces of the cooled ribbon and pairs of lower rolls 19, one of each pair of lower rolls being movable into and out of ribbon engaging position, which lower rolls engage the sheet as it is initially formed but which are usually out of engagement with the sheet during normal production. The rolls 18 and 19 are identical in construction.

FIG. 2 shows a typical traction roll 18 which includes a mandrel 20 onto which are assembled in side-by-side contacting arrangement a plurality of discs 22 of asbestos-aluminum silicate fiber-binder composition. End clamps and collars 24 hold the discs under pressure after their assembly.

THE PREFERRED EMBODIMENT

Figure 1:
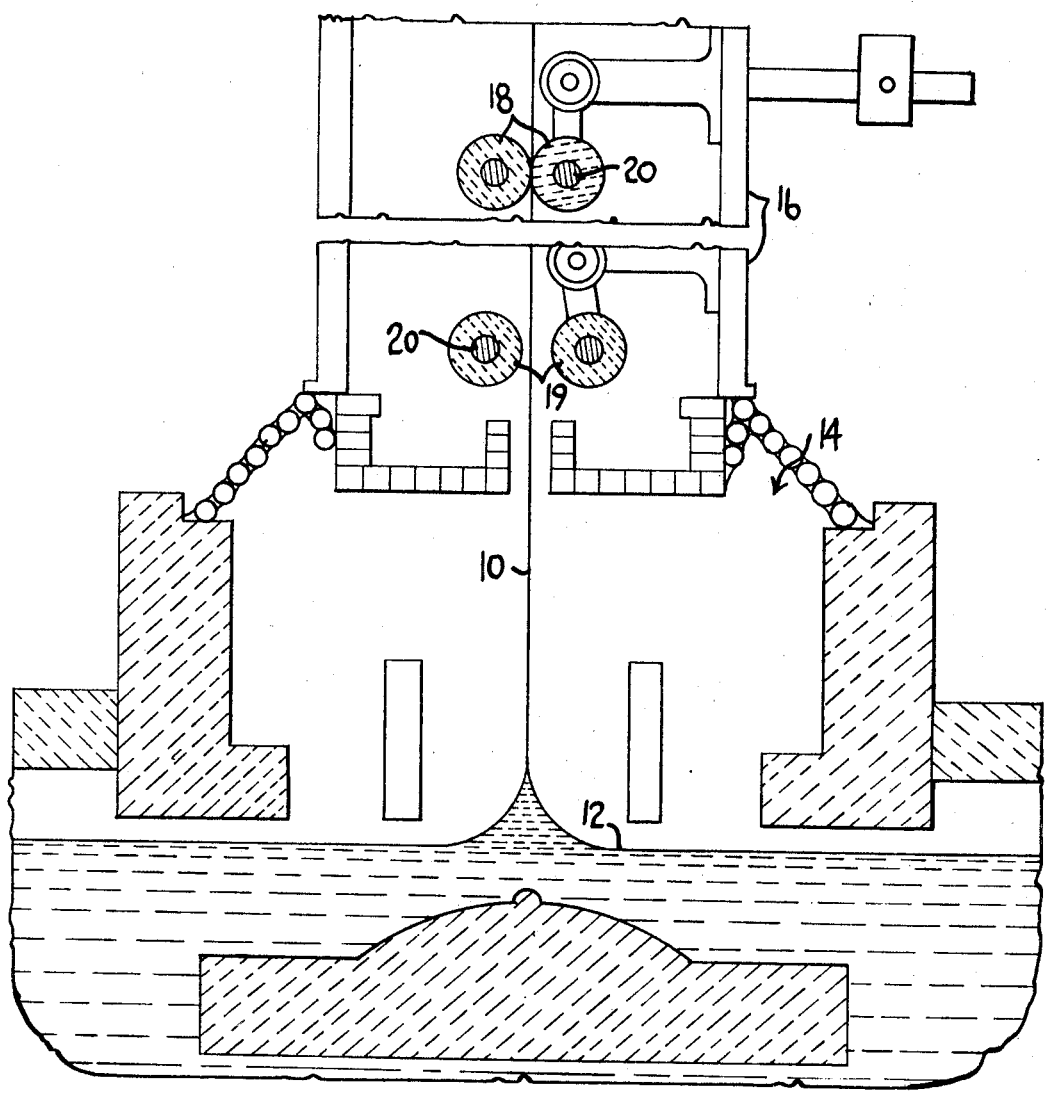
FIG. 1 is a schematic view of a typical Pittsburgh or Pennvernon sheet glass drawing arrangement.
Figure 2:
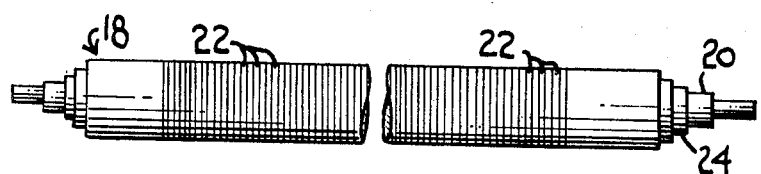
FIG. 2 illustrates a typical traction roll made in accordance with this invention and usable in the FIG. 1 arrangement.

Discs are cut from boards made of a mixture consisting essentially of 30 to 80 percent by weight of anthophyllite asbestos, 20 to 70 percent by weight Fiberfrax or Kaowool and 2 to 10 percent by weight binder, such as portland cement. The boards may be made by the usual paper making or wet mix process, as by laying down a plurality of layers of the mixture on a screen until a desired thickness has been built up, after which the board is dried, generally under moderate pressure. Discs are then punched from the board and assembled as before described.

Example I

A board was made by a wet mix process from a mixture of 75 parts by weight of anthophyllite asbestos, 25 parts by weight of Fiberfrax and 10 parts by weight of portland cement as a binder. The board was dried in the atmosphere under slight pressure. The board was heated to a temperature of 1100° F. by increasing the temperature 100° F. each 24 hours. After being at 1100° F. for 24 hours, the board was weighed and its weight compared with its weight before heating. Its ignition or weight loss was approximately 3.5 percent. Its weight loss was compared with a board made of 75 parts by weight anthophyllite asbestos, 25 parts by weight chrysotile asbestos and 10 parts by weight portland cement as a binder. After being heated for the same length of time and at the same rate, the ignition or weight loss of the anthophyllite-chrysotile board was determined to be 7.2 percent, double that of the board made by following the teachings of this invention.

The boards described in Example I were heated at the same rate up to 2300° F. and their weight losses were determined. The board of this invention had lost 6.7 percent of its weight; the other board had lost 10.6 percent of its weight.

What is claimed is:

1. A roll especially adapted for use at elevated temperatures having a material engaging surface of a mixture consisting essentially of 30 to 80 percent by weight of anthophyllite asbestos, 20 to 70 percent by weight of aluminum silicate fibers, and 2 to 10 percent by weight of a binder.

2. A roll as recited in claim 1 wherein said mixture consists essentially of 75 parts by weight of anthophyllite asbestos, 25 parts by weight of aluminum silicate fibers and 10 parts by weight of portland cement as a binder.

3. A traction roll especially for glass or other materials at elevated temperatures which includes a mandrel, a plurality of discs assembled on said mandrel and clamped thereon under pressure, said discs having a surface engaging said glass or other material, said discs being of a mixture consisting essentially of 30 to 80 percent by weight of anthophyllite asbestos, 20 to 70 percent by weight of aluminum silicate fibers and 2 to 10 percent by weight of a binder.

4. A traction roll as set forth in claim 3 wherein said mixture consists essentially of 75 parts by weight of anthophyllite asbestos, 25 parts by weight of aluminum silicate fibers and 10 parts by weight of portland cement as a binder.

References Cited

UNITED STATES PATENTS

| | | | |
|---|---|---|---|
| 3,014,835 | 12/1961 | Feigley et al. | 162—154 |
| 3,317,303 | 5/1967 | Shorr | 65—374 |

ARTHUR D. KELLOGG, Primary Examiner

U.S. Cl. X.R.

29—132; 65—374; 162—145, 154